UNITED STATES PATENT OFFICE.

CASIMIR WURSTER, OF LONDON, ENGLAND.

SIZING PAPER.

SPECIFICATION forming part of Letters Patent No. 695,778, dated March 18, 1902.

Application filed August 14, 1901. Serial No. 71,995. (No specimens.)

*To all whom it may concern:*

Be it known that I, CASIMIR WURSTER, a subject of the Emperor of Germany, residing at Dudley Mansion, 29 Abbey road, St. Johns Wood, N. W., London, England, have invented certain new and useful Improvements in Sizing Paper; and I do hereby declare the following to be a full, clear, and exact description of the invention, such as will enable others skilled in the art to which it appertains to make and use the same.

The sizing of paper by resin-soap or fatty soap and aluminium salts depends on the formation of free resin acid or fatty acid and only in minor degree on the formation of aluminium resinate, which has feeble waterproofing properties. Papers which appear to be badly sized in spite of the fact that they have from four to six per cent. of resin contain especially aluminium resinate. Although a mechanical mixture of aluminium sulfate and sulfuric acid may be substituted for aluminium sulfate for decomposing the resin-soap, such acid sizing presents technical difficulties in that the size is badly precipitated, especially if sulfuric acid is used alone. Moreover, this acid has an injurious action on the paper, particularly in presence of chlorids. The substitution of acetic acid for aluminium sulfate or sulfuric acid has not proved successful.

My invention relates to a method of sizing paper in which the resin-soap is decomposed by an acid sulfate, (bisulfate,) used either alone or in conjunction with an aluminium salt.

When a mixture of a bisulfate and aluminium sulfate is used, which in the case of hard sized paper is especially useful, the bisulfate decomposes the aluminium resinate first formed into aluminium hydroxid or insoluble slimy basic aluminium sulfate and free resin. The precipitated alumina is converted by the bisulfate into basic aluminium sulfate which is slimy and insoluble in water, so that the resin is finely divided and firmly united to the fiber. Basic aluminium sulfate which is soluble in water is not formed by the bisulfate, or only when an unusual excess of the latter is used. The workman will find by experiment which quantity of bisulfate will be suitable for his special purpose.

I prefer to use sodium bisulfate, which is a by-product and cheap; but an excess must be avoided, because of the small proportion of free acid which is often present in the commercial crude bisulfate. The workman will find by experiment what quantity of bisulfate will be suitable for his special purpose. Instead of the sodium salt other alkali bisulfates (those of the alkaline earths or of magnesium or zinc) may be used. I may use a single bisulfate or a mixture of different bisulfates. The proportion of bisulfate is preferably to be regulated so that any aluminium resinate formed may be decomposed into resin and basic aluminium salt.

The decomposition of resin-soap by alkali bisulfate may be expressed by the following equation, in which R represents the resin-acid residue:

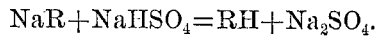
$$NaR + NaHSO_4 = RH + Na_2SO_4.$$

The decomposition of aluminium resinate may be expressed by the following equation:

$$2AlR_3 + 6NaHSO_4 = 6RH + Al_2(SO_4)_3 + 3Na_2SO_4.$$

For carrying out my invention I may proceed in the following way: I prepare a mixture of resin-soap and sodium bisulfate. The proportion of the bisulfate is chosen in such an amount that a suitable quantity of the resin-soap is decomposed by the bisulfate. The amount of this decomposition and of the quantity of the bisulfate depends on the proportion of free resin that the workman desires to use for sizing. If the workman desires to size with a larger quantity of free resin, he will use more bisulfate than when he desires to size with a lower quantity of free resin. The workman will know what amount of free resin will be suitable for his special purposes, or he may find this by experiment. The manner in which this mixture is to be used is the same as in sizing paper with the known preparations for sizing paper. I may mix the mixture of resin-soap and bisulfate with water to a suitable liquor, which will be then applied in the manner usual in sizing paper. I may also prepare a mixture of resin-soap, a suitable aluminium salt—for instance, potash alum or aluminium sulfate—and bisulfate. This mixture, the proportions of which may vary according to the desire of the workman, is used in the same manner as it is common in sizing paper with the known preparations. I may, however, proceed in the following way: I dissolve resin-soap in water and add to the liquor the suitable amount of bisulfate. Of course the resin-soap and the bisulfate may also be added at the same time to the water.

Having now particularly described and ascertained the nature of my said invention and the manner in which the same is to be performed, I declare that what I claim is—

1. The improvement in sizing paper consisting in decomposing the resin-soap used for sizing paper by a bisulfate.

2. The improvement in sizing paper which consists in adding to the resin-soap used in sizing paper a bisulfate and an aluminium salt.

In witness whereof I have hereunto set my hand in presence of two witnesses.

CASIMIR WURSTER.

Witnesses:
 HENRY HASPER,
 WILLIAM MAYNER.